United States Patent Office 2,992,907
Patented July 18, 1961

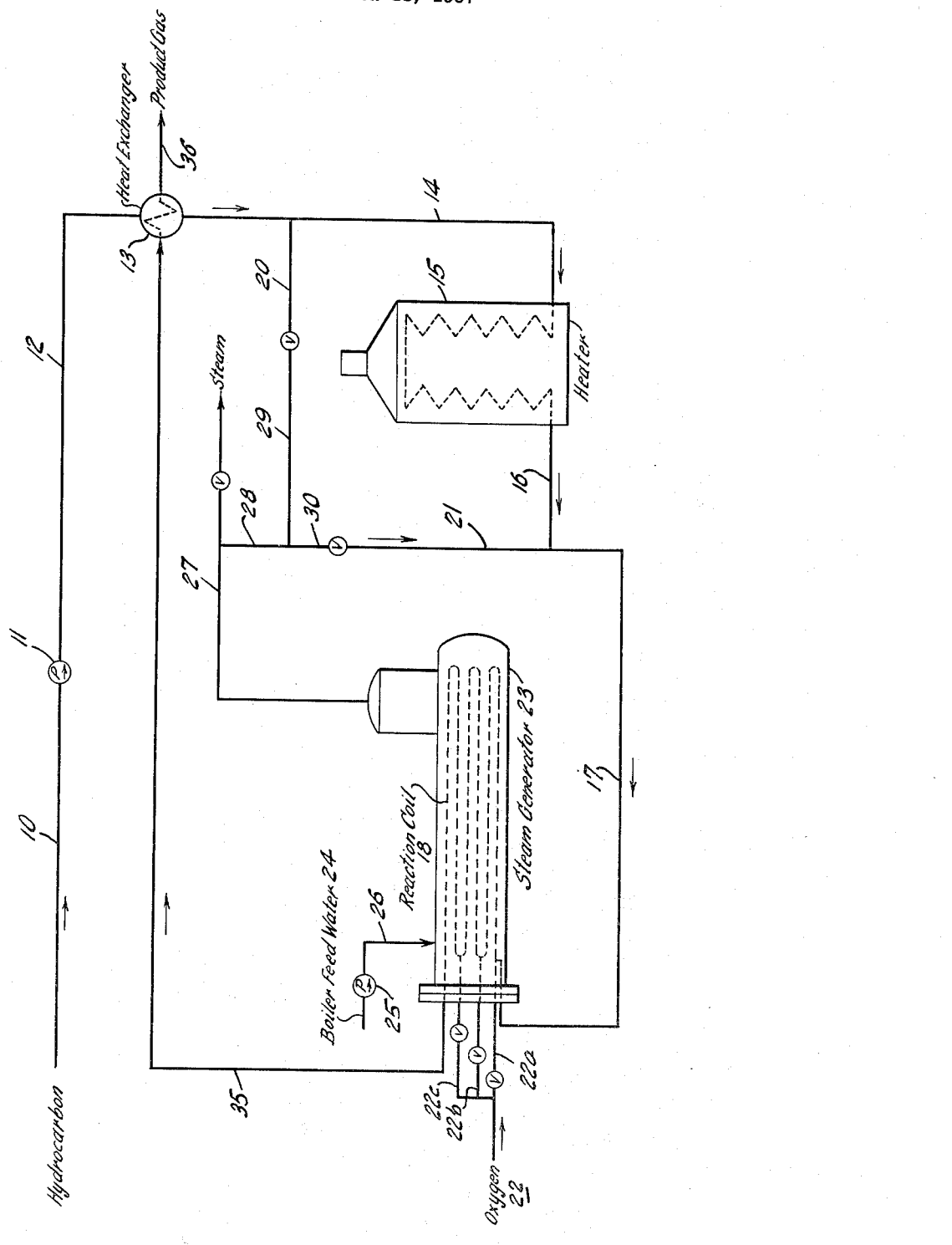

2,992,907
MANUFACTURE OF SYNTHESIS GAS
Harold V. Atwell, Wappingers Falls, N.Y., assignor to Texaco Inc., a corporation of Delaware
Filed Mar. 11, 1957, Ser. No. 645,099
7 Claims. (Cl. 48—212)

This invention relates to a method for the manufacture of synthesis gas from hydrocarbons. The invention comprises a process for the conversion of a hydrocarbon fuel to carbon monoxide and hydrogen by passing said fuel as a confined stream through an externally heated tubular heating zone wherein said fuel is heated to a temperature at which said fuel reacts spontaneously with uncombined oxygen, admixing a gas comprising uncombined oxygen with said fuel, and imparting a velocity in excess of about 50 feet per second and preferably in excess of 100 feet per second to the combined stream in an elongated tubular reaction zone to effect reaction of said uncombined oxygen and said fuel.

The generation of synthesis gas from hydrocarbons by reaction with oxygen is well known. Many references teach the necessity of conducting the reaction in the presence of a catalyst or a contact material. Alternatively, U.S. Patent 2,582,938, discloses that this reaction may be conducted at temperatures above about 2000° F. in a compact unpacked reaction zone having an internal surface area not more than about 1.5 times the area of a sphere of equal volume. I have now found that the reaction of oxygen with a hydrocarbon fuel may be effected in a tubular reaction zone under conditions of turbulent flow at relatively low temperature and with no catalyst.

This invention may be applied to the conversion of any hydrocarbon including gaseous, liquid, and normally solid hydrocarbon fuels. However, it is particularly applicable to the processing of fluid hydrocarbons which may be readily pumped or compressed into the tubular apparatus of my process. The synthesis gas comprising carbon monoxide and hydrogen produced in the process of my invention is useful for the synthesis of useful liquid hydrocarbons for the manufacture of fuel gas, or for the generation of hydrogen for the synthesis of ammonia.

Uncombined oxygen may be employed in the form of commercially pure oxygen, air, or oxygen enriched air. Advantageously, steam may be admixed with the hydrocarbon and oxygen in order to facilitate control of temperature and to increase the yield of hydrogen in the products. In the process of my invention any or part of the reactants may be preheated so that reaction spontaneously occurs upon combining the hydrocarbon and oxygen streams. Turbulent flow is maintained in the tubular reaction zone of my process by imparting a velocity in excess of about 50 feet per second to the reactants. The reaction pressure may range from atmospheric to about 600 lbs. per square inch gauge or higher. The reaction temperature is maintained within the range of about 1300 to about 2000° F. The temperature of the reaction zone may be controlled by cooling the external surface of the reaction zone. Temperature control may also be effected by introducing one of the reactants, preferably the oxygen, at a plurality of points in the reaction zone. Advantageously, heat contained in the reaction products may be employed in preheating the said streams by the use of conventional heat exchange equipment.

An advantage of the process of this invention is that rapid and complete reaction is facilitated by the maintenance of turbulent flow conditions.

Another advantage of the process of this invention is that the use of turbulent flow reaction conditions permits complete reaction to be effected at relatively low temperatures.

A further advantage of the process of my invention employing an elongated tubular reaction zone is that the reactor inherently provides a large contact surface for the reactants. The large contact surface further provides a large heat transfer surface which facilitates the control of reaction temperature.

Another advantage of the process of my invention is that the reaction of oxygen and hydrocarbon within the tubular reaction zone effects internal heating. Consequently, the reaction zone may have a considerably higher temperature than the temperature of the tube wall which confines the reaction zone.

Another advantage of the use of a tubular reaction zone is that such a reactor may be readily fabricated in a pressurized shell which permits balancing internal and external pressure and thereby avoiding high stress at high temperature.

The accompanying drawing diagrammatically illustrates one form of process of this invention. Although the drawing illustrates one arrangement of apparatus in which the process of this invention may be practiced, it is not intended to limit the invention to the particular apparatus or material described.

Hydrocarbon, from an external source not shown, is introduced to the system through line 10 by pump 11. Hydrocarbon flows through line 12 to heat exchanger 13 where it is preheated by exchange with hot effluent products. Preheated hydrocarbon is then passed through line 14 to heater 15 wherein the temperature of the flowing stream is raised to the temperature at which the hydrocarbon will react spontaneously with uncombined oxygen. The hot hydrocarbon is passed through lines 16 and 17 to reaction coil 18.

Oxygen from an external source not shown is introduced through line 22 and is passed through line 22a to the inlet of reaction coil 18. Reaction coil 18 is disposed in steam generator 23. The generation of steam serves to absorb the exothermic heat of reaction of the oxygen and hydrocarbon. The steam thus produced may be used within the process or elsewhere as desired. Water of boiler feed quality, from an external source not shown, is introduced through line 24, pump 25 and line 26 to steam generator 23. The steam produced is withdrawn through line 27 and may be discharged for external use or may be directed through lines 28, 29 and 30 to supply the steam introduced to the system through lines 20 and 21. The control of the temperature in reaction coil 18 is facilitated by injecting incremental quantities of oxygen at a plurality of points throughout the coil through lines 22b and 22c. Effluent product from reaction coil 18 is discharged through line 35 and may be employed to preheat the hydrocarbon feed in heat exchanger 13 before discharge from the system through line 36.

Example

In an embodiment of the process of this invention, a 14° API fuel oil is converted to a synthesis gas comprising carbon monoxide and hydrogen. The aforesaid 14° API fuel oil is characterized by a Saybolt Furol viscosity at 122° F. of 128.7, a pour point of +65° F., a gross heating value of 18,255 B.t.u.'s per pound, and the following ultimate analysis:

| | Weight, percent |
|---|---|
| Carbon | 83.76 |
| Hydrogen | 10.99 |
| Nitrogen | 0.66 |
| Sulfur | 3.73 |
| Oxygen | 0.86 |
| Total | 100.00 |

The heavy fuel is charged at a rate of 314 barrels per day with 6 gallons per minute of water to an externally fired tubular heater where the temperature of the water-oil mixture is raised to 800° F. The resulting mixture of oil and steam vapors is charged, along with 52,500 standard cubic feet per hour of 99.5% purity oxygen, to a tubular reaction coil disposed within a steam generator vessel. The reactants pass through this coil at velocities up to 1200 feet per second where reaction takes place between the steam, oxygen and oil to produce a synthesis gas comprising mainly carbon monoxide and hydrogen. This reaction takes place at a temperature of 1575° F. which is maintained by absorbing the exothermic heat of reaction by the production of steam in the steam generator.

Substantially complete conversion of the oil to gaseous products is realized and after suitable cooling, 217,000 standard cubic feet per hour of dry gas having the following composition is obtained:

| | Mol, percent |
|---|---|
| Carbon monoxide | 46.9 |
| Hydrogen | 46.5 |
| Carbon dioxide | 4.8 |
| Methane | 0.6 |
| Nitrogen and argon | 0.3 |
| Hydrogen and carbonyl sulfides | 0.9 |
| Total | 100.0 |

Obviously many modifications and variations of the invention as hereinbefore set forth may be made without departing from the spirit and scope thereof and only such limitations should be imposed as are indicated in the appended claims.

I claim:

1. A process for the conversion of a hydrocarbon fluid fuel to a gas comprising carbon monoxide and hydrogen which process comprises heating said fuel to a temperature at which the fuel reacts spontaneously with uncombined oxygen, pumping the heated fuel into an elongated tubular reaction zone, introducing a gas comprising uncombined oxygen into said reaction zone, maintaining the velocity of the reactants in the reaction zone at not less than 50 feet per second to produce turbulent flow within said tubular reaction zone, externally cooling said tubular reaction zone to maintain the reaction zone temperature within the range of 1300–2000° F., maintaining the rate of flow of materials through the tubular reaction zone at at least said velocity until the reaction between the fuel and uncombined oxygen is substantially complete and withdrawing product gas comprising carbon monoxide and hydrogen from the reaction zone.

2. The process of claim 1 in which portions of said gas comprising uncombined oxygen are added to said elongated reaction zone at a plurality of points spaced along said reaction zone.

3. The process of claim 1 in which said hydrocarbon fuel is normally liquid hydrocarbon fuel.

4. The process of claim 1 in which the product gas is passed in indirect heat exchange relationship with said hydrocarbon fuel before introducing said fuel to the reaction zone.

5. The process of claim 1 in which a velocity in excess of about 100 feet per second is imparted to the reactants in the reaction zone.

6. A process for the conversion of a hydrocarbon fluid fuel to a gas comprising carbon monoxide and hydrogen, which process comprises heating said fuel to a temperature at which the fuel reacts spontaneously with uncombined oxygen pumping the heated fuel into an elongated tubular reaction zone, introducing a gas comprising uncombined oxygen into said reaction zone, maintaining the velocity of the reactants in the reaction zone at not less than 50 feet per second to produce turbulent flow within said tubular reaction zone, absorbing heat from said tubular reaction zone in a steam generating zone to maintain the reaction zone temperature within the range of 1300–2000° F., maintaining the rate of flow of materials through the tubular reaction zone at at least said velocity until the reaction between the fuel and the uncombined oxygen is substantially complete and withdrawing product gas comprising carbon monoxide and hydrogen from the reaction zone.

7. The process of claim 6 in which the internal and external pressures of the elongated tubular reaction zone are in balance.

References Cited in the file of this patent

UNITED STATES PATENTS

| 1,228,818 | Pictet | June 5, 1917 |
| 1,286,135 | Sommermeier | Nov. 26, 1918 |
| 1,904,908 | Voorhees | Apr. 18, 1933 |
| 2,563,460 | Faber | Aug. 7, 1951 |
| 2,701,756 | Eastman et al. | Feb. 8, 1955 |

OTHER REFERENCES

The Inventor and his World, by S. Hatfield, published by Kegan Paul, Trench, Trubner and Co., Ltd., 1933, pp. 190–191.

Ser. No. 303,852, Szigeth (A.P.C.), published Apr. 2, 1943.